Nov. 9, 1965   C. C. RAYBURN   3,216,096
APPARATUS FOR MANUFACTURING MODULES
Filed March 31, 1961   6 Sheets-Sheet 1
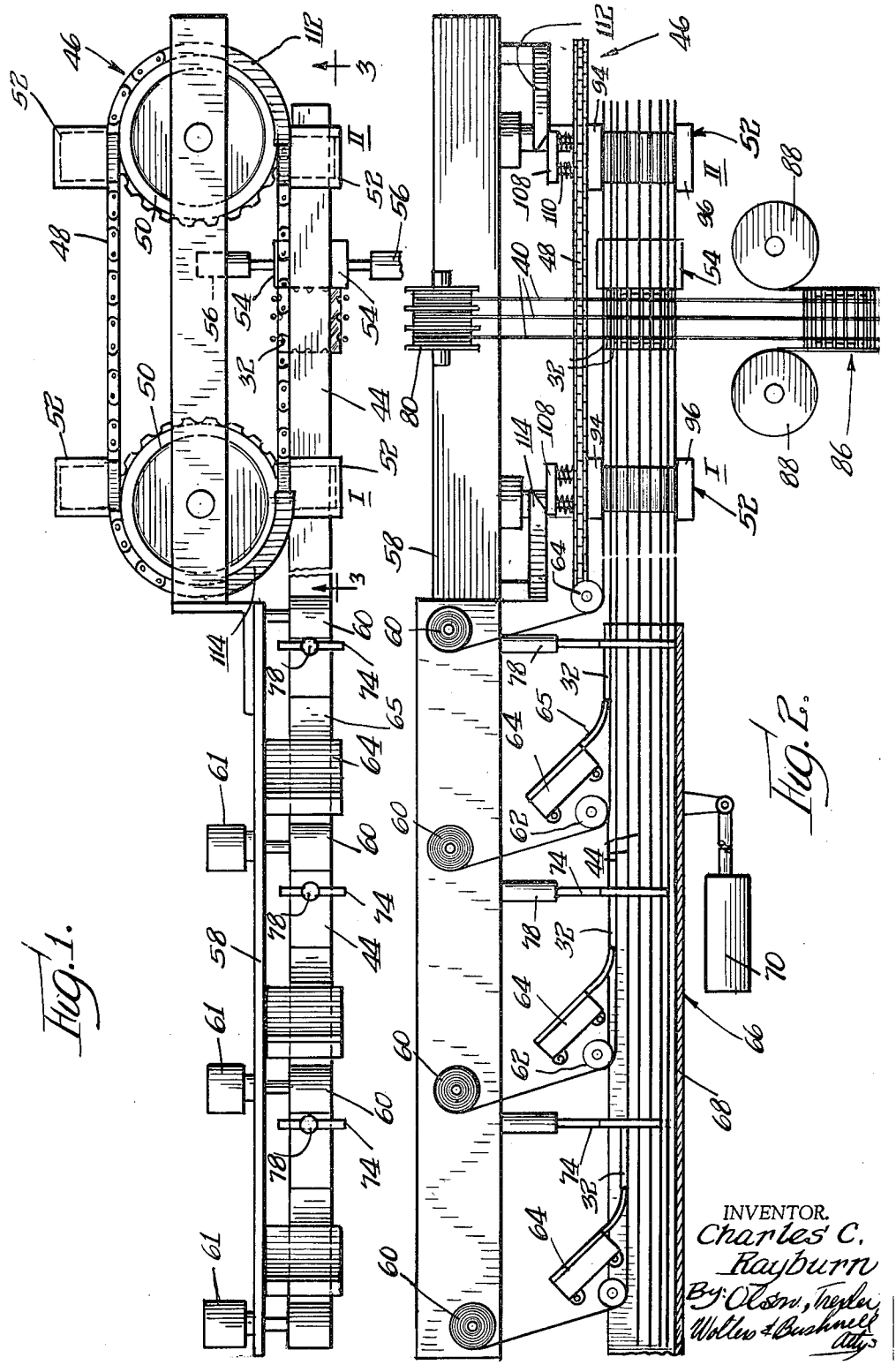

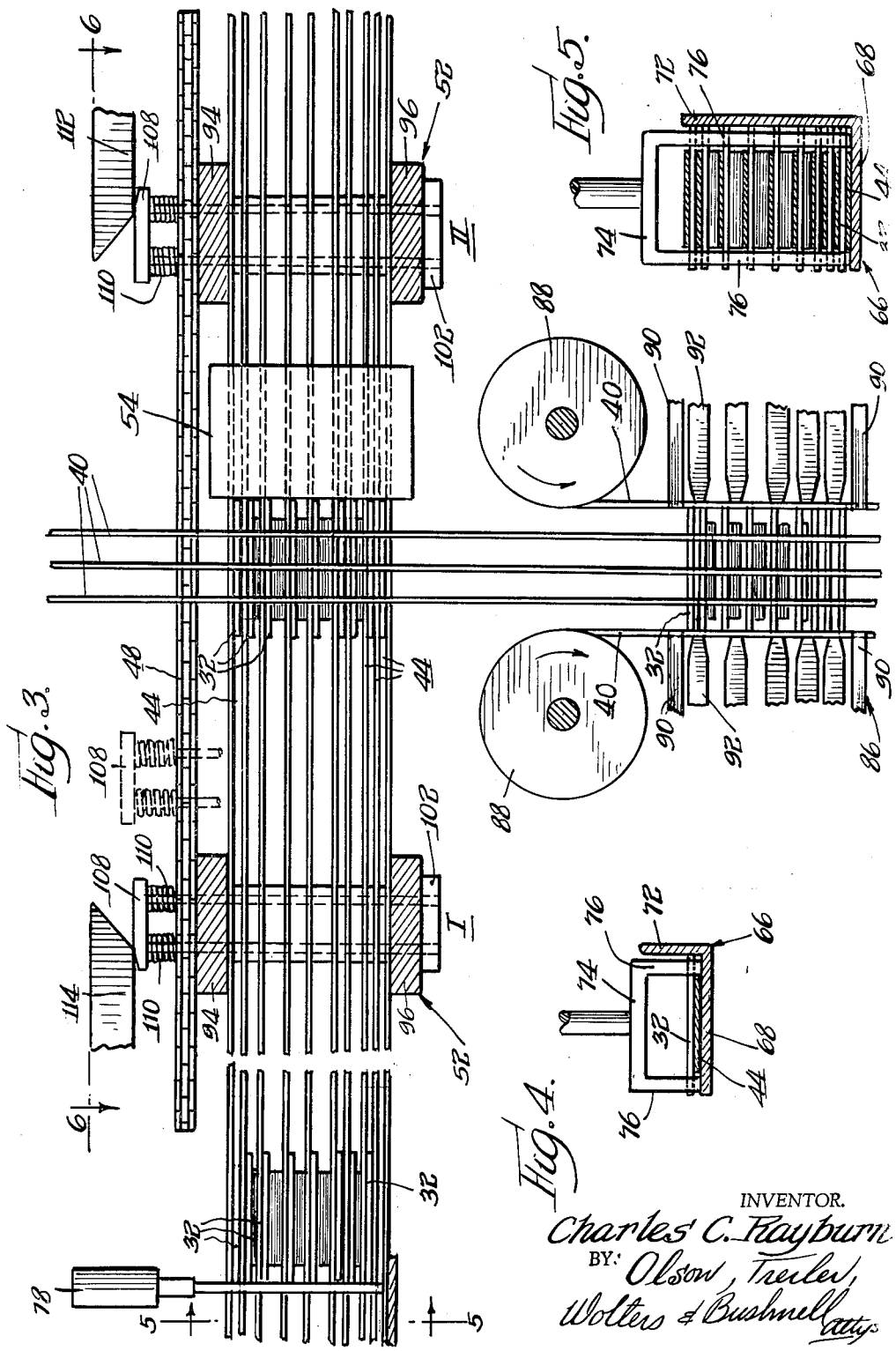

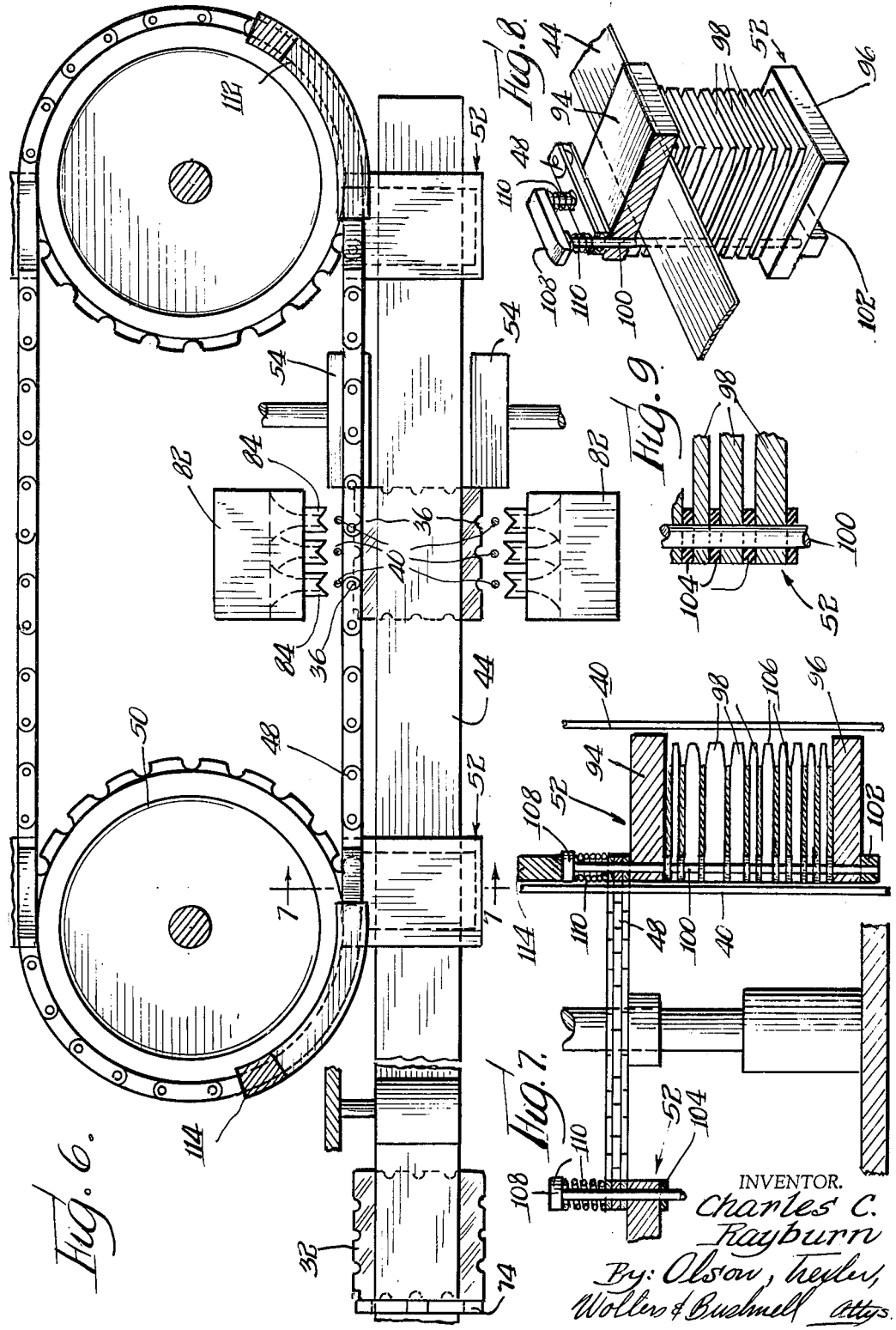

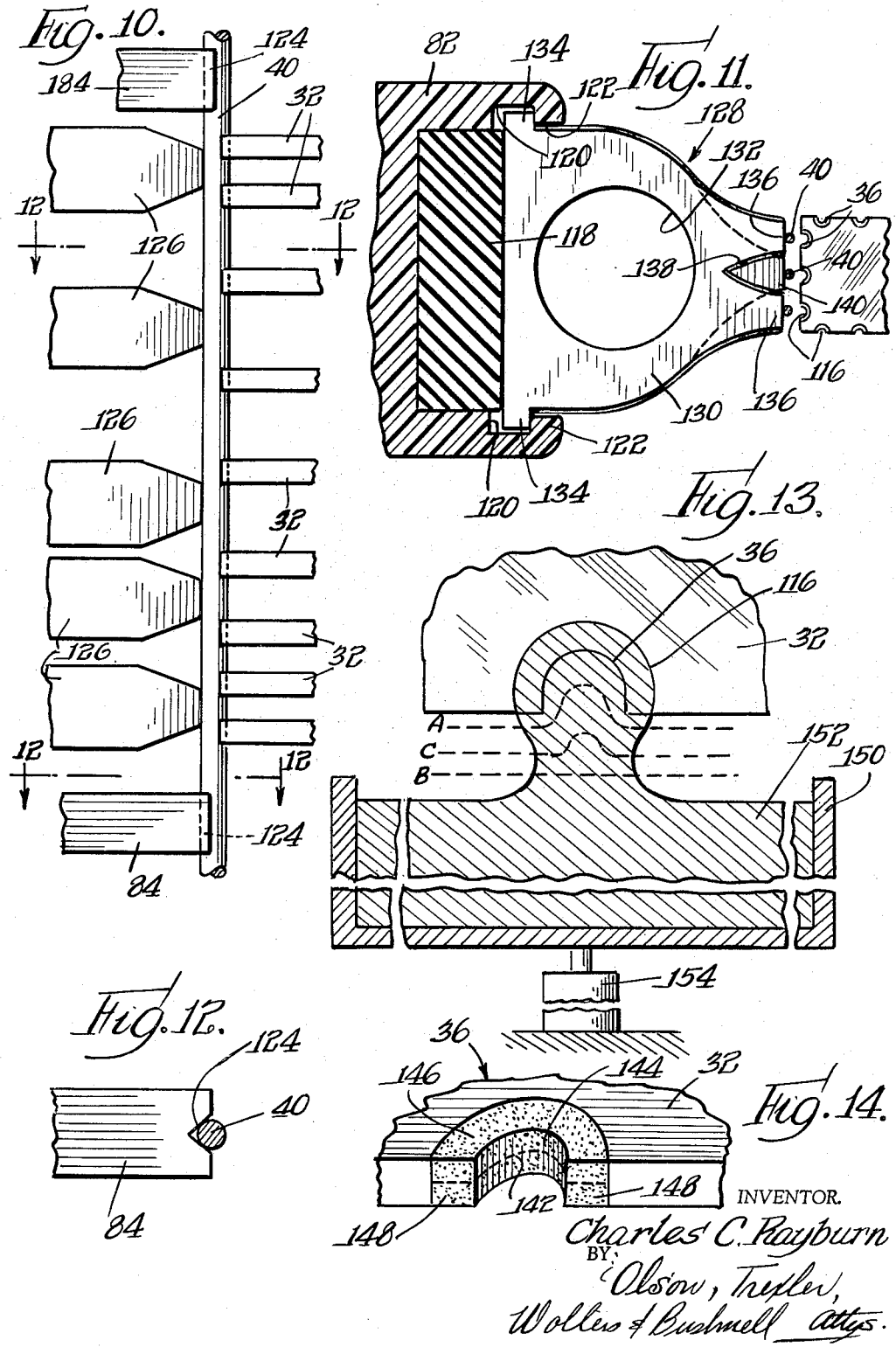

INVENTOR.
Charles C. Rayburn

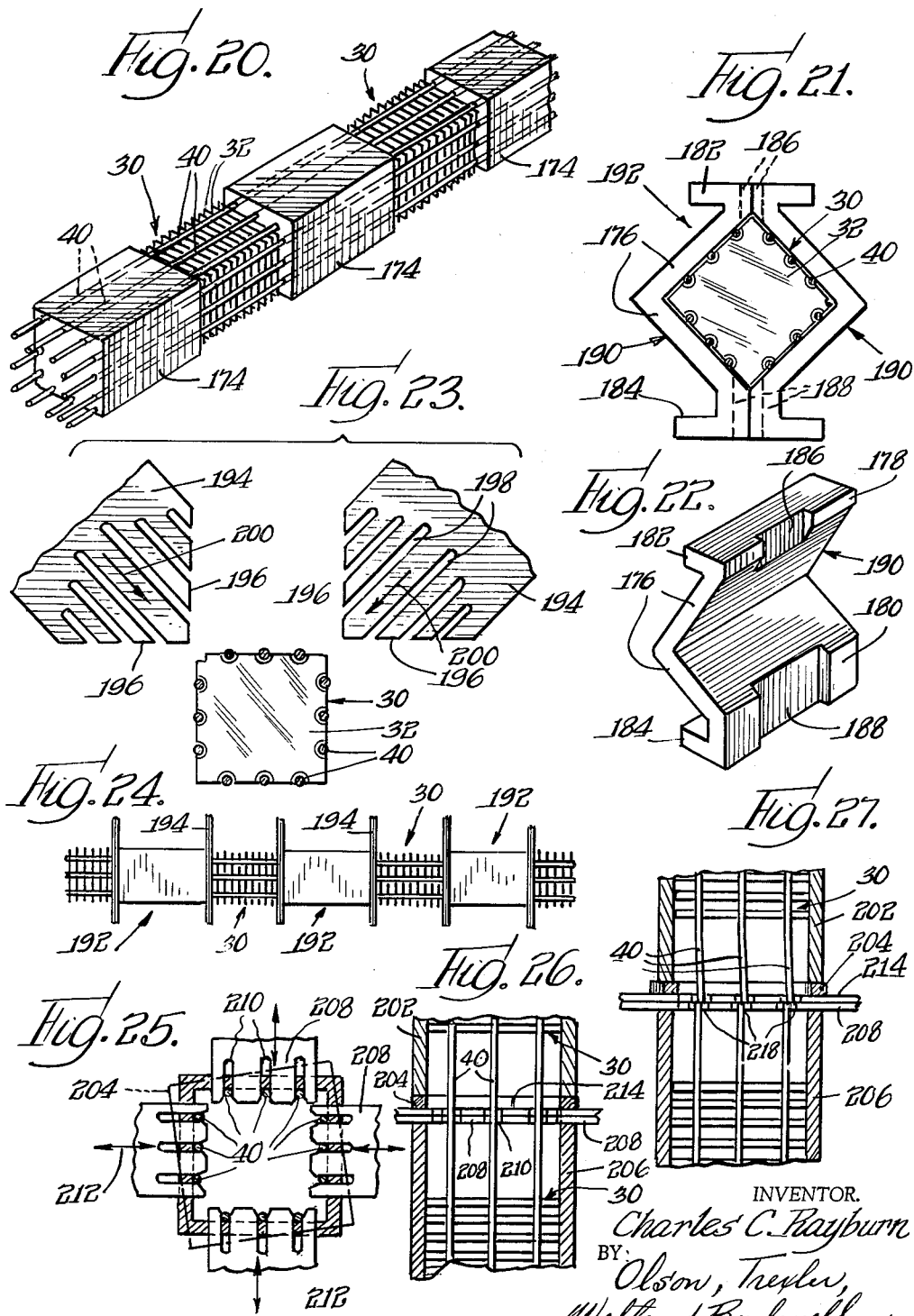

United States Patent Office 3,216,096
Patented Nov. 9, 1965

---

3,216,096
APPARATUS FOR MANUFACTURING MODULES
Charles C. Rayburn, Alexandria, Va., assignor to Illinois Tool Works Inc., a corporation of Delaware
Filed Mar. 31, 1961, Ser. No. 100,485
28 Claims. (Cl. 29—203)

This invention relates to novel apparatus for producing micro-modules.

Electronic modules, as is now well known in the art, comprise basic elements in the nature of wafers, which may be of ceramic or other insulating material. These wafers have printed circuit wiring thereon, and may include other components, such as capacitors, resistors, tube sockets, etc. A plurality of these wafers is arranged in spaced, stacked relation, held together by riser wires soldered to terminals along the edges of the wafers, and generally also held together by encapsulation, as with an epoxy resin. The conventional wafers are on the order of one inch square, and of appreciable thickness. Thus, they have sufficient size that methods and apparatus have heretofore been developed for handling them, and for assembling them into modules.

A later development consists of what is known as micro-modules. The micro-modules are of a much smaller size, three-tenths of an inch being the order of the length of any side. The wafers are on the order of .001 inch thick, and are separated from each other in a stack on the order of .0001 inch. While these particular dimensions may not coincide with a given wafer and module, they are typical of the dimensions involved. Obviously, the sizes are such as to preclude handling by conventional or known machines. Extensive manual handling is prohibitive from a cost standpoint, and further from the standpoint of contamination.

Accordingly, it is an object of this invention to provide apparatus for handling micro-wafers and for producing micro-modules.

A further object of this invention is to provide apparatus using a common mechanism for supporting and conveying micro-wafers before and during assembly into micro-modules.

It is another object of this invention to provide apparatus for producing micro-modules in sticks or lengths comprising a plurality of modules.

Yet another object of this invention is to provide apparatus for producing micro-modules wherein the wafers before assembling into modules are supported flat on tapes which serve both as conveyors and spacers for the wafers.

Another object of this invention comprises providing novel apparatus for encapsulating the wafers of micro-modules to complete formation of the modules.

Other and further objects and advantages of the present invention will be apparent from the following specification when taken in connection with the accompanying drawings wherein:

FIG. 1 is a plan view illustrating an apparatus constructed in accordance with the principles of the invention;

FIG. 2 is a side view thereof;

FIG. 3 is an enlarged partial side view showing a detail of the apparatus;

FIG. 4 is a vertical sectional view through the machine showing a part of the conveyor thereof;

FIG. 5 is a view similar to FIG. 4, but taken at a different location, as along the line 5—5 in FIG. 3;

FIG. 6 is an enlarged fragmentary plan view as taken along the line 6—6 in FIG. 3;

FIG. 7 is a further enlarged detail vertical sectional view as taken along the line 7—7 in FIG. 6;

FIG. 8 is a schematic view of the clamping mechanism of the conveyor;

FIG. 9 is a fragmentary vertical sectional view therethrough;

FIG. 10 is a fragmentary side view showing the welding apparatus and method;

FIG. 11 is a horizontal sectional view therethrough as taken along the line 11—11 in FIG. 10;

FIG. 12 is a horizontal sectional view taken along the line 12—12 in FIG. 10, showing electrical contact to the wire;

FIG. 13 is a somewhat schematic view illustrating the application of solder to a wafer;

FIG. 14 is an enlarged perspective view illustrating certain considerations relative to the soldering;

FIG. 20 is a perspective view showing a stick of modules as prepared for encapsulation;

FIG. 21 is a sectional view showing a portion of a mold for preparing for encapsulation;

FIG. 22 is a perspective view of a portion of the mold;

FIG. 23 is an end view showing further mold portions for advance preparation for encapsulation;

FIG. 24 is a side view showing the stick of modules as arranged for pre-molding relative to encapsulation;

FIG. 25 is a somewhat schematic top view showing parts for severing of the riser wires;

FIG. 26 is a side view thereof; and

FIG. 27 is a similar side view, but showing the actual cutting operation.

Figure 16:
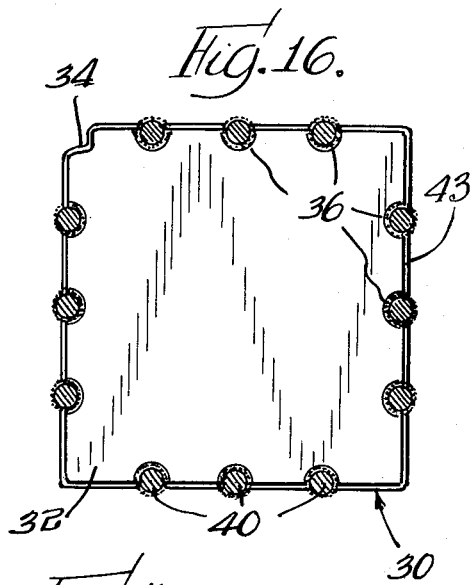
FIG. 16 is a horizontal sectional view through a module.
Figure 17:
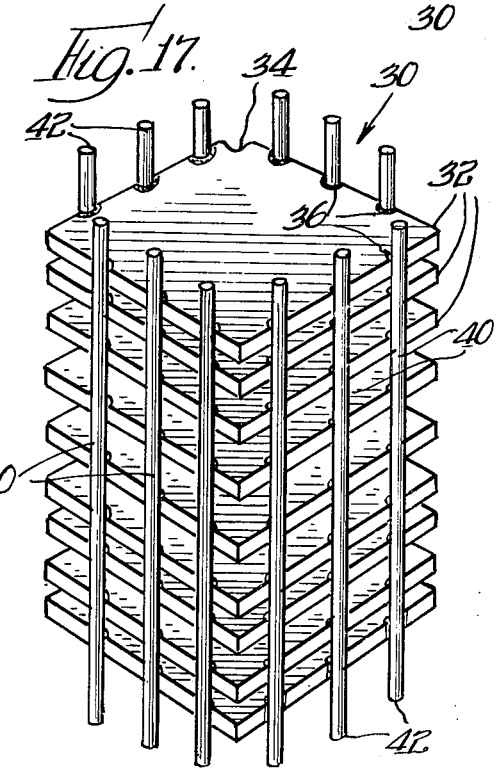
FIG. 17 is a perspective view of a module before encapsulation.

Before starting with the apparatus and method, it is thought that it might be helpful to turn to FIGS. 16 and 17 for a representation of a module. In brief, a module 30 comprises a stack of spaced-apart wafers 32, of ceramic or other insulating material. The wafers are substantially square, having one corner removed therefrom at 34 for use in properly orienting the wafers. The wafers are provided with printed circuit wiring (not shown), and are provided along each of the four edges thereof with substantially semi-circular notches 36. The notches of the vertically spaced wafers are aligned, and riser wires 40 are soldered in the notches. Not every notch has a riser wire soldered therein, as will be appreciated, and as will be discussed hereinafter. The riser wires may be cut off flush with the bottom of the bottom wafer, and with the top of the top wafer, in which case plug-in connections may be provided on the top or bottom wafer, or the wires may extend beyond the top and bottom wafers as shown at 42.

As will be appreciated, this case relates particularly to micro-modules, and the scale of FIGS. 16 and 17 is rather substantially enlarged. One final consideration is that there is preferably an insulating coating on the surface and edges of each wafer, as illustrated at 43. The wafers preferably are pre-coated at the factory with a very thin thermoplastic coating, on the order of molecular thickness. This coating aids in electrically insulating the wafers from one another on the surfaces thereof, and further prevents corrosion and the like forming thereon during the time between manufacture of the wafers and encapsulation thereof in modules. The very thin thermoplastic coating does not inhibit soldering, as will be brought out hereinafter.

Reference should be had now to FIGS. 1 and 2 for a general understanding of the invention. The heart of the invention resides in the provision of a plurality of plastic tapes 44. These tapes are horizontally disposed, and are spaced apart to support and space the wafers 32. The tapes 44 must be quite thin, tough, and dimensionally stable. A preferred material is the polyester fiber known as Mylar. The tapes are moved in an oscillating or reciprocating manner, as hereinafter set forth, in order to allow assembled modules to be removed from the ends thereof.

Thus, for forward movement, there is provided a chain conveyor mechanism 46 including a chain 48 and a pair of sprocket wheels 50, at least one of which is driven in proper time relation by a suitable drive means (not shown). Stacked clamping mechanisms 52 are equally spaced about the chain, and suitable guides may be used for stabilizing these members, if so desired, in accordance with principles well known in the chain conveyor art. The free ends of the tapes 44 are gripped by one of the gripper or clamp members 52 at station I, and are pulled along to station II, the tapes carrying wafers properly oriented thereon. The wafers are wider than the tapes, and are stopped at a welding station by movable stops 54 lying on either side of the tapes, and movable in and out of stopping position by any suitable means such, for example, as pneumatic cylinder means 56. The riser wires are welded on at this position, as will be set forth hereinafter. With the clamp or gripper means 52 released, the tapes then are simultaneously retracted, by means hereinafter set forth whereby to free the soldered module for lowering to another location. The tapes then are clamped by the next gripper mechanism 52, and again are pulled from station I to station II, to pull another stack of wafers into position for soldering the riser wires thereon.

Loading of the tapes is shown in FIGS. 1 and 2, and it will be observed that above the position of the tapes there is provided a machine frame member 58 on which is mounted in horizontally spaced relation a plurality of supply spools 60. Tape is pulled from the spools, but the spools wind up clockwise by a suitable motor drive, such as electric motors 61. Each tape passes downwards and under an idler roller 62. The idler rollers are successively spaced slightly lower, moving away from the conveyor and soldering mechanism locations. Specifically, each idler 62 is spaced down from the next one to the right thereof, as seen in the drawings, by an amount equal to the thickness of one of the tapes 44 and the wafer underlying that tape.

Diagonally disposed above each idler 62 is a wafer magazine 64. The particular construction of each magazine is shown in my copending application Ser. No. 99,-782, filed on March 31, 1961, and entitled "Method and Apparatus for Handling and Transporting Articles." Suffice it to say, that each magazine is constructed to dispense a wafer edgewise therefrom at a predetermined time from a stack of wafers therein. This general type of magazine is well known in the art, and is sometimes referred to as a "cookie magazine." The wafer passes down an inclined chute 65 from the magazine on to the tape passing immediately thereunder. Each tape is supported by the underlying wafer and tape, and the lowermost tape is supported by a right angle member 66 having a horizontal flange 68 underlying the lowermost tape. This support preferably moves back and forth with the tapes under the control of a suitable mechanism, such as a cylinder and piston arrangement 70 in FIG. 2. As will be appreciated, reciprocation of the support or guide member 66 is for the purpose of preventing wear on the tapes, and it could be dispensed with with shortened tape life. With reference to FIGS. 4 and 5, in addition to FIGS. 1 and 2, it will be seen that the angle member 66 also has a vertical flange 72 engageable with the edges of the wafers for stabilizing the stack thereof. This vertical flange may be of varying height, in accordance with the number of tapes adjacent each portion thereof, or it may be of constant height, commensurate with the requirements for the entire stack of tapes and wafers. It will be appreciated that FIG. 4 is taken at the extreme left end of the apparatus, where there is only one tape 44 and one wafer 32, while FIG. 5 is taken at the extreme right end just before the tapes are gripped by the gripper or clamp mechanisms. To prevent the wafers from moving back when the tapes are retracted by the motors 61, there is provided a plurality of fork-like members 74, one immediately downstream from each magazine 64 and inclined guide 66. The fork members 74 are provided with spaced-apart vertical tines 76 lying on opposite sides of the tapes 44, and not quite touching the tapes. As has been noted heretofore, the wafers are wider than the tapes, and the tines 76 are spaced so as to engage the wafers near the outer edges thereof. The forks are arranged to be reciprocated vertically, as by means of the pneumatic piston and cylinder arrangements 78. Vertical reciprocation of the fork members is controlled by a suitable master control, such that the forks are raised when the tapes move forward, and are lowered immediately before and during retraction of the tapes. Accordingly, the opposite corners of one or more wafers up to a complete stack thereof butt up against the depending fork tines 76 and are prevented from moving backwards with the tape. The toughness, dimensional stability, and relatively low friction of the tape surface is quite important in this movement. The tines 76, besides preventing retraction of the wafers, also insure proper vertical alignment of the wafers in a stack.

Turning now to FIG. 3 along with FIGS. 1 and 2, it will be seen that six riser wires 40 are supplied from reels 80 spaced above the tapes and supported by the machine frame member 58. These wires may be guided by suitable guides (not shown) to positions spaced laterally of the wafers carried by the tapes 44, whereby the wafers may move into position between the riser wires, the riser wires being oriented in two sets of three each. Welding heads 82 (FIG. 6) provided with presser feet and also with electrodes 84, as hereinafter will be described in greater detail, then move in toward the tapes, and press the wires 40 into the notches 36, wherein they are rapidly welded, as set forth hereafter in greater detail. The heads 82 then retract. As previously set forth, the motors 61 then retract all of the tapes from the forward position to a position back toward station I, whereby the wafers 32 which have just been soldered to the riser wires 40 are free of the tapes. The wires are then advanced from the reels, as by a power drive of the reels, to lower the welded stack of wafers to a position spaced well below the tapes, as shown at the station 86 at the bottom of FIG. 3.

Two additional sets of spools 88 supplying riser wires 40 are spaced on the opposite sides of the stacks, to supply two sets of three wires each to the three sides of the wafers that have not previously received wires. Soldering heads bearing electrodes 90 and pusher-sinks 92 then move in from the side to press the riser wires 40 into the grooves and to solder them in place.

Simultaneously with the soldering operation at station 86, another soldering operation has been performed with the wafers on the belts as previously described, a new supply of wafers having been delivered by the belts or tapes 44 against the stops 54. The stops have been illustrated as being retractable, but they could be left fixed in place with the wafers simply sliding down the front edges of the stops. However, fixed stops would present problems relative to the conveyor mechanism, which are more readily solved with movable stops.

The conveyor mechanism will be more clearly understood with reference to FIGS. 6–9.

Although various types of gripper or clamp structures 52 could be provided, one form thereof is shown in FIGS. 7, 8 and 9. The gripper structure 52 as shown in these figures comprises pressure pads 94 and 96. Intermediate the upper and lower pressures pads are a plurality of spacer clamps 98. All of these spacer clamps 98 are not of the same thickness, since the thickness thereof is predetermined in accordance with the thickness of a wafer to be handled on the same level by the conveying mechanism including the tapes 44. Vertical rods 100 are fixed against vertical upward movement in the bottom pressure pads 96, as by means of heads 102 underlying the bottom pressure pads. The various spacer clamps 98, as best seen in FIG. 9, are spaced from one another by means of resilient members such as rubber washers 104. The outer ends of the spacer clamp members 98 preferably are tapered, as indicated at 106 to facilitate entrance of these members between the plastic conveyor tapes. The upper ends of the rods 100 extend through links of the chain 48 and are provided with heads 108 which are resiliently urged up by means of compression springs 110 trapped between the heads 108 and the links of the chain. The springs are sufficiently strong as normally to urge the upper and lower pressure pads 94 and 96 toward one another, whereby to compress the washers 104, and thereby to move the upper and lower pressure pads and all of the clamps relatively toward one another, whereby to grip the tapes 44 as a normal condition. When it is desired to release the gripping members to allow the tapes to be retracted, the heads 108 pass under fixed cams 112 arcuately disposed adjacent the right hand sprocket wheels 50. These cams could etxend most of the way around the chain conveyor, but this is not necessary, as on the back side of the conveyor it is immaterial whether the gripper members are in gripping or non-gripping condition. However, another cam 114 is arcuately disposed adjacent the left hand sprocket wheel 50, whereby again to open the gripper member as it approaches the tapes. The tapered ends on the intermediate clamp members 98 facilitate entrance of these members between the tapes. After the heads 108 have passed off the cam 114, the pressure pads again are urged toward one another, and the tapes are gripped, again to pull them toward the right, as the new gripper mechanism 52 arriving at station I moves on to station II.

In FIG. 7, the riser wires 40 on the right side of the figure will be seen to lie normally outside of the path of the outermost extremities of the gripper mechanisms 52. Similarly, the riser wires 40 on the left lie to the left of the path of the conveyor 48 as to the reach thereof which is parallel to the tapes. The riser wires 40 on the left side are relatively free before being soldered to the wafers, and hence may pass within the outlines of the conveyor chain 48. However, at the bottom the wires cannot pass within the outline of the conveyor chain, since the wires are soldered to the wafers before being lowered past the previous bottom level. It is for this reason that the pressure mechanisms are necessarily supported from above, although other support means could be used if the three wires on the left side were severed after being soldered to the wafers. As will be appreciated, the risers are moved into engagement with the wafers for soldering thereto by the electrodes 84 and the pusher-sink members mounted therewith on the heads 82. Further details of the soldering of the riser wires 40 to the wafers 32 may be seen in FIGS. 10, 11 and 12. The notches 36 are previously provided with solder inserts 116 by a process hereinafter to be disclosed. The wafers may have a thermoplastic coating thereon, as previously disclosed at 43 in FIG 16. The pressure heads 82 are constructed of insulating material. The head 82 is provided in its face with a relatively wide and shallow recess having a block of silicone rubber 118 therein, with confronting notches 120 and forwardly disposed retaining flanges 122 disposed forwardly of the block 118. Each head 82 carries electrodes 84 at its upper and lower end, and these electrodes are provided with V-shaped notches 124 for bearing against the riser wires 40 to provide two lines of contact therewith. Intermediate the electrodes there is provided a plurality of pusher-sinks 128, positioned in spaced relation more or less in accordance with the number and spacing of the wafers 32. The pusher-sinks are made of aluminum, for heat conductivity, and the construction thereof is best seen in FIG. 11.

The head 82 carries a plurality of pusher-sinks 128. Each pusher sink comprises a cored body 130 having a tunnel 132 therethrough for air passage and rapid removal of heat. The corners of the body adjacent the head 82 are provided with outwardly directed lugs 134 fitting in the recesses 120 behind the flanges 122. The pusher sinks bear against the silicone rubber cushion 118, whereby the lugs 134 are resiliently urged out against the flanges 122, whereby to provide a resilient loading on the pusher-sinks. The pusher-sinks are made of aluminum for good heat conductivity, and also because of its poor soldering characteristics, which makes solder unlikely to stick thereto.

The operating ends of the pusher sinks alternate from one to another. Thus, one pusher sink has a plurality of presser feet 136 with a notch 138 between them. These feet are engagable with the two outboard ones of the riser wires 40 on one side of a wafer. Alternate pusher-sinks have just a single central presser foot 140 engageable with the center riser wire 40. All of the outer surfaces of the pusher-sinks 128 are provided with a coating of plastic material having a very slippery surface, such as the fluorocarbon polymer known as "Teflon." This coating, except on the working faces of the shoes or feet, and in the tunnel or aperture 132 prevents any solder that might drip from sticking to the sinks.

The riser wires 40 are momentarily given a high overload of current between the electrodes 84, whereby very rapidly to heat the wires to a high temperature so that they will melt into the solder 116 in the notches 36. Typically each wire carries about 25 amperes of current for about one-third second. As will be appreciated, the pusher sinks 128 thermally load the wires to assure uniform heating thereof along the length, and prevent overheating and burning up of the wire. As soon as the current is turned off, the heat of fusion is extracted in about one-sixth of a second, and the soldering process is completed. Thus, there is a total of only about one-half second from the time soldering starts until the soldering is complete. The silicone rubber blocks 118 assure proper pressing of the wires into the notches without damaging the wafers 32.

When the wafers are pre-coated as indicated at 43 in FIG. 16 with a thermoplastic insulating covering, the solder 116 in the notches 36 is also covered. However, the wires become so hot so very rapidly that they simply locally burn through the insulation and fuse the solder without causing damage to the insulation away from the location of the wires. Normally, flux is needed with solder to prevent oxidation. However, the heating and subsequent cooling of the solder takes place so rapidly that practically no oxidation takes place, and no flux is needed. Micro-modules that have been assembled by this process have a joint appearance resembling notch-riser joints produced by dip soldering, in that the solder has a distinct shine to the surface. Since the riser wires themselves are used as heating elements, all oxidized soldering by-products are carried out of the soldering area along with each module. Thus, there is no build-up to result in process and product non-uniformity.

Riser-to-notch joint strength is dependent on time and temperature if the metal conductors on the surface of the ceramic wafer are solder soluble, such as silver. In fact, it has been experimentally shown that solid state diffusion continues at a much lower rate after the solder has solidified, but is at a temperature near its fusing point. The high heat drain supplied by the pusher sinks keeps the notches from remaining at an elevated temperature for more than a very short time, thereby minimizing the solder solution and diffusion. Accordingly, maximum joint strength is obtained.

The initial metallization or printed circuit wiring should cover the shaded area shown in FIG. 14. If there exists even a thin line as dotted at 142 where the metallization pattern is incomplete, air rapidly parts the solder as the piece is withdrawn from the solder reservoir surface in which the wafer is dipped for tinning, and the solder mass disappears into a thin film which barely wets the exposed metal.

On the other hand, too much solder in the notch presents a problem. As the solder in the notch is displaced by the riser wire, it builds up around the notch, and could cause electrical or mechanical interference, bearing in mind that the wafers are spaced only on the order of .0001 inch.

Surfaces 148 do not require metallization for proper tinning or solder pickup. This is essential only in the concavity 144 of the notch, and on the surface area 146 about the notch. However, it has been found in practice that metallization of the surface of the concavity 144 terminating precisely at the junction thereof with the edge surfaces 148 is quite difficult mechanically. Accordingly, it has been preferable to maintain the width of the notch plus the two surfaces 148 as a constant.

Assuming uniform notch metallization and constant soldering conditions with regard to temperature, alloy, immersion rate, flux, and immersion time, the critical variable which controls the amount of solder in the notch is the inertial reaction of uncommitted solder. This is illustrated in FIG. 13.

In FIG. 13 there is shown a container 150 of molten solder 152. The container is mounted for up and down movement by means of a pneumatic or hydraulic piston and cylinder arrangement 154. The wafer 32 is held for dipping in accordance with any known or suitable techniques. If the wafer is quasistatically raised, or the solder level is similarly lowered by means of the piston and cylinder arrangement 154, an uncommitted volume of solder between the surfaces A and C will, by virtue of its inertia, break at line A if the wafer is highly accelerated upwards. This results in too little solder in the notch. Similarly, if the reservoir 150 is highly accelerated downward, the solder will break at line B, leaving to much solder in the notch. Since the soldered surface is very concave prior to breaking, the actual break should occur along line or plane C in order that the solidified surface will have receded to plane A. Thus, notch solder quantity may be accurately controlled by properly controlling the rate at which the wafer 32 and solder reservoir 150 are accelerated apart.

As will be appreciated, it is not desired that every riser wire 40 should be soldered in every aligned notch 36 of all of the wafers 32 of a module 30. In particular, one wire might be soldered in the aligned notches of the top several wafers of a module, while a second wire might be soldered in the notches aligned therewith in the remaining wafers. Since the wires are handled as continuous sections, it is not practical to solder two wires separately. Furthermore, conventional cutting techniques would not allow a wire to be soldered in all of the aligned notches, with the wire subsequently severed, since the extremely small spacing of adjacent wafers precludes the entrance of a conventional cutting tool between them. Furthermore, the wires are so delicate that they cannot withstand any substantial side thrust.

Figure 15:
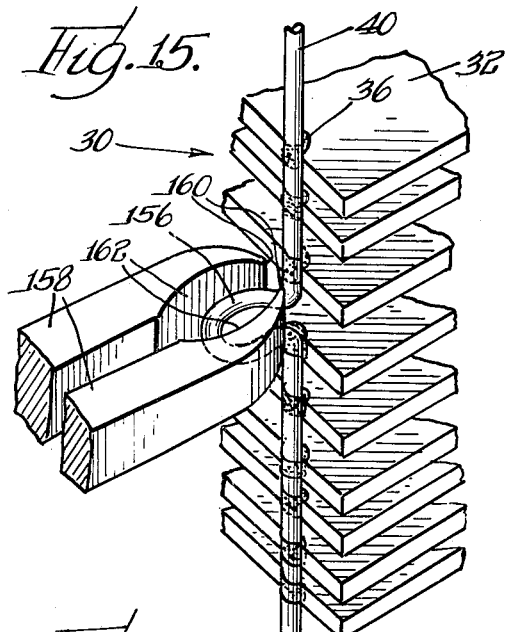
FIG. 15 is a perspective view illustrating severing of certain wires of a module.

Provision for discontinuous riser wires is illustrated in FIG. 15. Thus, a crimp or reentrant portion 156 is provided in a riser wire 40 where it is desired to provide a discontinuity in the wire. This crimp can be provided readily by the wire supplying means, such as by an indentation in a pulley.

A pair of end cutters 158 is provided having vertical sharpened edges 160 for cutting off the wire immediately above and below the crimped or reentrant portion. The cutters preferably are provided with concavities 162 to accommodate the crimped or reentrant portion 156 of the riser wire.

Figure 18:
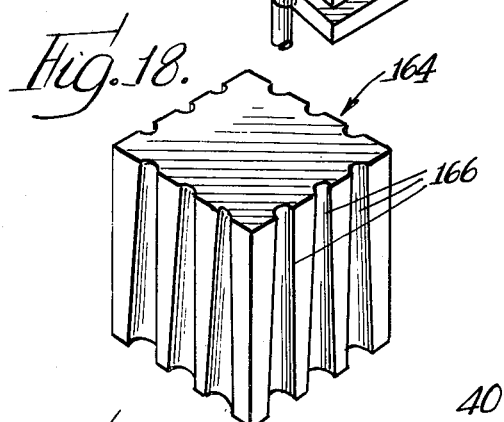
FIGS. 18 and 19 are perspective views showing the component parts of a support and wire protecting mechanism to be used for testing encapsulation.
Figure 19:
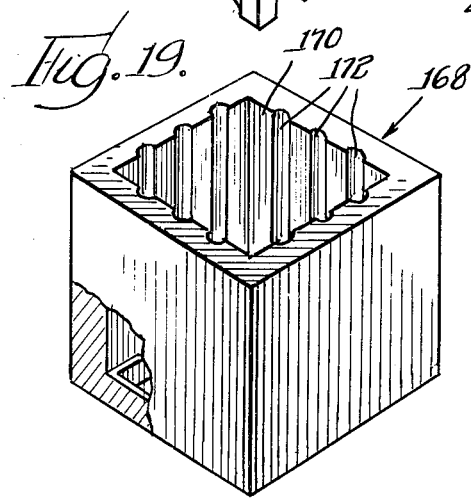

The micro-modules preferably are encapsulated, as in an epoxy resin. In some instances, it may be desirable to test the modules electrically before they are encapsulated. When the riser wires have been severed between adjacent modules to allow testing of the modules, these wires are quite vulnerable to physical damage. Accordingly, to protect the wires, the guards shown in FIGS. 18 and 19 are provided. FIG. 18 shows an internal guard 164 molded of hard plastic. The guard is square in cross-section, and is provided with three flutes 166 on each face thereof. The radius of the flutes at the top is the same as the wire diameter. At the bottom, the flutes are of larger diameter, to facilitate entrance of the wires, and also to provide draft in molding the internal guard 164. There is also provided an external guard 168 shown in FIG. 19, molded of resilient plastic. This external guard is provided with a longitudinal aperture 170 complementary to the internal guard 164 and dimensioned to form a fairly tight fit therewith. Flutes 172 are provided on the inner faces of the guard 168, and an internal shoulder preferably is provided at the bottom of the external guard 168. The tops of both the guards 164 and 168 are slightly larger than the bottoms thereof to provide draft in molding. In any event, the guards 164 and 168 are telescoped immediately adjacent a module with the wires received in the flutes 166 and 172. With the wires so held, the modules may be tested electrically without danger of physical damage to the extending wires. In addition, the guards may be left on the wires, guards being provided at both ends of a module, and the encapsulating material then may be cast about the module wafers and riser wires between the guards.

A preferred method of encapsulation is shown in FIGS. 20–24. A "stick" of several modules, perhaps five feet in length, can be severed from the riser wires, and all of the several modules therein can be encapsulated simultaneously. This is done by protecting the riser wires 40 between the modules 30 with blocks of wax 174. The wax is of a type that melts at a higher temperature than the curing temperature of the epoxy resin encapsulating material, but will melt at a temperature only slightly higher than the curing temperature of the epoxy resin, whereby the wax can be melted from place after the resin has been cast about the wafers and riser wires of the modules.

Mold side members are shown in FIGS. 21 and 22, and are of symmetrical construction. Each mold side member comprises a pair of right angularly disposed walls 176, upper engaging edges 178, and lower engaging faces 180 of slightly greater height. Lateral flanges 182 and 184 are provided at the upper and lower edges respectively. Recesses 186 are provided at the top for air vent purposes, and recesses 188 are provided at the bottom for entrance of the resin in fluid form.

When the two mold halves 190 are assembled as shown in FIG. 21, they form a mold 192 which is complete except for the ends. The mold halves may be secured together in any known or suitable manner, as by means of spring clips.

The ends of the molds are sealed off by means shown in FIGS. 23 and 24. Two plate-like members 194 are respectively disposed diagonally off adjacent corners of the mold and of a module and are provided with tapered noses, each having a pair of right angularly disposed sides 196. The noses are provided with longitudinal slots 198, there being three slots in each edge or face 196, the slots being progressively deeper toward the center line of the members 194. The members 194 are advanced longitudinally of themselves, and diagonally of the modules, as indicated by the arrows 200. The notches or slots 148 pass over the riser wires 40, and the two members 194 between them seal off the end of each mold 192 adjacent a riser. The wax, which melts at about 95° C., is injected or poured into the mold with the mold cold, and quickly sets about the wires. The molds are then removed, including the end plates 194, leaving the stick as shown in FIG. 20. If the wafers have not been pre-coated, as previously suggested, the entire stick of wafers is now provided with a thin coating of insulating material to protect the surface of each wafer. Such material may be applied in any conventional manner, as by dipping, spraying, cloud chamber condensation, etc. In some instances, this is sufficient. However, in other instances it is desired to encapsulate the modules, as in an epoxy resin. With some types of resin, and for some desired types of encapsulation, the entire stick may be dipped into the epoxy resin in a fluid form, and then removed therefrom, the resin having sufficient viscosity to cover the outside of each module completely. If a much less viscous material is used for encapsulation, mold members such as the mold 192 may be used to insure proper encapsulation.

After the modules have been encapsulated, the riser wires between modules can be severad simply by sawing through the wax blocks 174. If this is done while the stick is still hot from curing the epoxy resin, at say 85° C., the wax may very readily be stripped from the wires, since it has poor adhesion to the risers at this temeprature.

Alternatively, the wax may be melted from the risers by raising the temperature above the melting point of the wax, such as 95° C. The riser wires are then severed as shown in FIGS. 25–27.

An upper rectangular frame member 202 is provided having at the bottom thereof a section 204 which is rotatable about the axis of the frame member. The frame member receives one module 30 wihh the risers 40 extending downwardly therefrom. Directly beneath the frame 202 is another rectangular frame 206, receiving another module 30. The risers are continuous, as will be seen in FIG. 26, and the frames are of sufficient size to hold the modules. The frames may be in the vertical position illustrated, or in any other satisfactory position.

The lower frame 206 holds a set of four knife members 208 of fork-like configuration, each having three slots 210 therein. The knife members are reciprocable in and out of the interior of the frame, as indicated by the arrows 212. When the knife members are in their innermost positions, the slots 210 receive the riser wires 40, as in FIGS. 25–27. The upper rotatable frame section 204 supports a similar plurality of knife members 214 having slots 216 therein. With the knife members 214 projected to their inner positions, the risers 40 are received in the slots 216 thereof. At this time, the upper frame section 204 is rotated about its axis, whereby to swing the knives to sever the risers as indicated at 218 in FIG. 27, without imposing any substantial side thrust on the risers. The rotated position of the upper frame section 204 is indicated in dashed lines in FIG. 25.

There has now been disclosed an improved apparatus and method for assembling modules, particularly micromodules. Specifically, the apparatus and method include novel conveying means for simultaneously conveying, aligning and spacing the wafers of the micro-modules, and for soldering riser wires thereto while the wafers are still on the conveyor means. Improvements in soldering techniques, and in encapsulation of the modules, and of severing the riser wires thereof also are disclosed, all forming a part of the process of manufacturing the modules, particularly micro-modules.

Although certain specific structures and methods have been specifically shown and discussed, it is to be understood that these are exemplary only. Various changes will no doubt occur to those skilled in the art, and are to be understood as forming a part of this invention insofar as they fall within the spirit and scope of the appended claims.

The invention is claimed as follows:

1. Apparatus for assembling modules comprising module wafer conveying means including a plurality of parallel spaced apart conveyor belts arranged in superimposed relation respectively supporting and transporting a plurality of wafers to an assembly station, means for affixing a plurality of riser wires to wafers supported by said belts at said assembly station, and means for thereafter removing the wafers and riser wires from said belts.

2. Apparatus for assembling modules comprising parallel vertically spaced conveying means supporting wafers on the faces thereof, means for affixing a plurality of riser wires to aligned wafers supported by said conveying means, and means for thereafter removing the wafers and riser wires from said conveying means.

3. Apparatus as set forth in claim 2 wherein the supports are of predetermined thickness in accordance with the spacing of adjacent wafers.

4. Apparatus as set forth in claim 2 wherein the supports comprise elongated flexible members.

5. Apparatus for assembling modules comprising module wafer conveying means including a plurality of vertically spaced supports for transporting said wafers to an assembly station, said supports being narrower than said wafers and supporting said wafers from the faces thereof with a pair of opposed lateral edges thereof exposed, means for affixing a plurality of riser wires to the exposed lateral edges of said wafers while supported by said supports, and means for thereafter removing the wafers and riser wires from said supports.

6. Apparatus as set forth in claim 5 wherein the supports comprise elongated flexible members.

7. Apparatus for assembling modules comprising module wafer conveying means including a plurality of elongated spaced-apart supports arranged in superimposed relation respectively supporting a plurality of wafers from the faces thereof, means for advancing said wafer conveying means lengthwise of said supports to convey a plurality of wafers to a wire applying station, means adjacent said wafer conveying means for aligning a plurality of wafers in stacked relation, means at said wire applying station for affixing a plurality of riser wires to said wafers while supported by said supports, and means for thereafter retracting said supports in the opposite lengthwise direction thereof to facilitate the removal of said wafers and riser wires in a direction transverse to said supports.

8. Apparatus as set forth in claim 6 wherein the supports are of a predetermined thickness in accordance with the desired spacing of the wafers, and wherein the supports engage confronting faces of said wafers.

9. Apparatus as set forth in claim 7 wherein the supports comprise elongated flexible members.

10. Apparatus as set forth in claim 7 and further including stop means positioned adjacent said conveying means to prevent retrograde movement of said wafers, and means for retracting said stops from stopping position during forward movement of said conveying means and the wafers thereon.

11. Apparatus for assembling modules comprising module wafer conveying means including a plurality of parallel spaced-apart supports arranged in superimposed relation respectively supporting and transporting a plurality of wafers to an assembly station, means at said assembly station for affixing a plurality of riser wires to a pair of oppositely disposed edges of said wafers while supported by said supports, means for thereafter removing the wafers and riser wires from said supports, means for subsequently moving said wafers and riser wires affixed thereto to another station, and means at said other station for affixing riser wires to other oppositely disposed edges of said wafers.

12. Apparatus for assembling modules comprising module wafer conveying means including a plurality of parallel spaced-apart supports arranged in superimposed relation respectively supporting a plurality of wafers by the surfaces thereof, means for advancing said conveying means lengthwise of said supports, said supports being narrower than said wafers and leaving exposed lateral edges of said wafers, means for affixing a plurality of riser wires to said wafers on the exposed edges thereof while supported by said supports, means for thereafter retracting said supports to free said wafers and riser wires therefrom, means for subsequently feeding the riser wires and wafers in the direction transverse to said supports to another station, and means at said other station for affixing additional riser wires to said wafers.

13. Apparatus for assembling modules comprising module wafer conveying means including a plurality of substantially parallel vertically spaced elongated flexible conveyor members respectively supporting a plurality of wafers, means for gripping the ends of all of said elongated flexible members, means for moving said gripping means to advance said elongated flexible members lengthwise thereof to carry wafers to a wire applying station, means at said wire applying station for applying a plurality of riser wires to said wafers while supported by said flexible members, means for retracting said elongated flexible members in the opposite lengthwise direction to free said wafers and risers therefrom.

14. Apparatus as set forth in claim 13 wherein the means for gripping the flexible members comprises a plurality of members interleaved with said flexible members and respectively of substantially the same thickness as the wafers whereby properly to space said flexible members.

15. Apparatus as set forth in claim 13 and including at least a second gripping means, means for inserting said second gripping means in gripping position relative to said flexible members before retraction thereof, retraction of said flexible members removing them from the first mentioned gripping means and pulling them through the second gripping means, and means for thereafter operating said second gripping means again to advance said flexible members.

16. Apparatus for assembling modules comprising module wafer conveying means including a plurality of vertically spaced flexible belt-like members, take-up reel means for said belt-like members respectively spaced horizontally, means for loading wafers on to said flexible members in the vicinity respectively of each of said reel take-up members, means for advancing said flexible members longitudinally thereof to a wire applying station for transferring said wafers thereto and means at said wire applying station for affixing a plurality of riser wires to said wafers.

17. Apparatus for assembling modules comprising module wafer conveying means comprising a plurality of parallel vertically spaced supports, said wafers being wider than said supports and resting on their faces thereon with opposite lateral edges exposed, said exposed edges having pre-tinned edge notches, means for moving said supports lengthwise thereof to convey a plurality of aligned wafers to a wire applying station, means at said wire applying station for positioning a plurality of riser wires in alignment with said pre-tinned notches, and electrode means engageable with said wires on opposite sides of the plurality of aligned wafers for electrically heating said wires to cause said pre-tinned notches to become molten for soldering said wires thereto.

18. Apparatus as set forth in claim 17 and further including means for rapidly cooling said wires and the solder joints formed in said notches.

19. Apparatus as set forth in claim 18 wherein the cooling means comprises pusher members engageable with said wires to urge said wires into the notches, and of high thermal conductivity.

20. Apparatus as set forth in claim 19 and further including means resiliently loading the wire pusher members in the direction of the wires.

21. Apparatus as set forth in claim 20 wherein the wire pusher members comprise metallic members having restricted nose portions respectively engageable with the wires, and having relatively enlarged body portions with hollow cores therein for facilitating air cooling.

22. Apparatus for assembling modules comprising module wafer conveying means including a plurality of vertically spaced elongated supports narrower than said wafers supporting said wafers from the underfaces thereof with a pair of opposed opposite lateral adges of said wafers exposed, said exposed adges having means thereon for connection of riser wires thereto, means for advancing said conveyor means to move said wafers to a wire applying station, means for securing a plurality of riser wires to the exposed adges, means for withdrawing the supports from the wafers, means for advancing the wafers and riser wires longitudinally of the riser wires, means for thereafter securing additional riser wires to other edges of said wafers, means for subsequently severing the riser wires to separate the stacks of wafers into modules, and end block means applied to said severed wires adjacent at least one end of a stack of wafers for protecting said wires.

23. Apparatus for protecting electrical modules during the testing thereof, said modules composed of a plurality of stacked wafers having riser wires attached thereto and extending from at least one end of the stack, comprising a pair of telescoping end blocks, an internal block having longitudinal flutes therein, and an external block having a central passageway adapted to receive the internal block and having internal flutes therein engageable with the extending riser wires, the riser wires also being disposed in the external flutes of the first mentioned block.

24. Apparatus as set forth in claim 23 wherein the inner block is relatively rigid and the outer block is relatively resilient, and whereby the flutes in at least one of said blocks are tapered longitudinally.

25. Apparatus for producing electrical modules comprising means for securing a riser wire to the exposed edges of a plurality of spaced parallel module wafers, said riser wire having a re-entrant loop therein, and means for removing said re-entrant loop from said riser wire to leave a discontinuity in said riser wire, said removal means comprising cutter means having opposed cutting edges substantially parallel to said riser wire for severing thereof without imposing substantial lateral force thereon.

26. Apparatus for assembling modules comprising a plurality of parallel spaced apart supports arranged in superimposed relation each respectively supporting a wafer by the underface thereof, a plurality of said wafers being in stacked alignment on said supports, means for affixing a plurality of riser wires to said wafers while supported by said supports, and cutter means advanceable into position among said riser wires and engageable with opposite sides of each of said riser wires to sever said riser wires without imposing appreciable side thrust thereon.

27. Apparatus as set forth in claim 26 wherein the cutter means comprises a pair of sets of like cutters in substantially abutting engagement, and means for rotating one of the sets of cutters relative to the other substantially about the axis of the wafers and riser wires.

28. Apparatus for producing electric modules comprising means for supporting a stack of modules interconnected by a plurality of riser wires, means for inserting a plurality of pairs of cutters among the riser wires, and means for relatively shifting the pairs of cutters in opposite directions to sever said riser wires without imposing substantial side thrust thereon.

References Cited by the Examiner
UNITED STATES PATENTS

| | | | |
|---|---|---|---|
| 2,182,968 | 12/39 | Lunsford | 29—417 |
| 2,577,584 | 12/51 | Hofreiter | 18—36 |
| 2,835,962 | 5/58 | Tally et al. | 29—203 |

WHITMORE A. WILTZ, *Primary Examiner.*

JOHN F. CAMPBELL, *Examiner.*